US006925647B1

(12) United States Patent
Kabasawa

(10) Patent No.: US 6,925,647 B1
(45) Date of Patent: Aug. 2, 2005

(54) DISK DEVICE

(75) Inventor: Hidetoshi Kabasawa, Tokyo (JP)

(73) Assignee: TEAC Corporation, Tokyo (JP)

( * ) Notice: Subject to any disclaimer, the term of this patent is extended or adjusted under 35 U.S.C. 154(b) by 91 days.

(21) Appl. No.: 10/402,906

(22) Filed: Mar. 28, 2003

(30) Foreign Application Priority Data

Mar. 29, 2002 (JP) ........................................ 2002-097076
Mar. 29, 2002 (JP) ........................................ 2002-097128

(51) Int. Cl.[7] .............................................. G11B 33/02
(52) U.S. Cl. .................................. 720/601; 369/75.21
(58) Field of Search ................................ 720/601, 600; 369/75.21, 75.11

(56) References Cited

U.S. PATENT DOCUMENTS

| 4,710,910 A | * | 12/1987 | Ejiri ........................... 369/75.2 |
| 6,181,663 B1 | * | 1/2001 | Kakuta et al. .............. 369/77.1 |
| 6,522,614 B1 | * | 2/2003 | Kim ........................... 369/77.1 |
| 6,529,461 B1 | * | 3/2003 | Watanabe et al. ........... 369/75.2 |
| 6,603,723 B2 | * | 8/2003 | Minase ....................... 369/75.2 |
| 6,625,098 B1 | * | 9/2003 | Minase et al. .............. 369/53.2 |

FOREIGN PATENT DOCUMENTS

| JP | 11-339354 | 12/1999 |
| JP | 2000-030334 | 1/2000 |

* cited by examiner

Primary Examiner—Allen Cao
(74) Attorney, Agent, or Firm—Weingarten, Schurgin, Gagnebin & Lebovici LLP

(57) ABSTRACT

The object is to allow to dispose the lock pin of the eject/lock mechanism of the disk device at the outermost side of the disk tray, and to enhance the packaging effective area of the wiring board to its maximum. Moreover, the eject/lock mechanism is protected even if an impact load is applied to the disk device built into the laptop PC, dashing out of the disk tray is intercepted, and system safety and reliability are improved. A disk device composed to load/unload with a recording medium by making a disk tray advance and retreat in a chassis case, wherein an eject/lock mechanism A operating together with a self-holding type solenoid 16 is arranged in the front edge corner portion of the disk tray 1 and, on the other hand, a start lever 18 that changes over the eject/lock mechanism to the lock state extends along a sidewall of the disk tray, a lock lever 8 that can swing and fit with the chassis case 8 is provided on the disk tray 1 so that the oscillation of the lock lever 8 be inhibited when the disk tray 1 receives the impact load in the load state.

7 Claims, 14 Drawing Sheets

DISK DEVICE

BACKGROUND OF THE INVENTION

1. Field of the Invention

The present invention concerns disk device that drives an optical disk (for instance, CD-R/RW, DVD-R/RW, etc.) as the recording medium for recording a great deal of information in various computer systems and so on.

2. Detailed Description of the Prior Art

In general, the personal computer (hereinafter, it is called PC) cannot lack the disk device for recording/reproduction of information by an optical disk, and builds the same into the PC main body or connects with the cable as so-called external.

FIG. 7 shows the externals of a laptop PC with a built-in disk device, and in general, the disk device D is built into a side of the PC main body P, the part of bezel 102 of a disk tray 1 pops out according to the instruction from the switch operation or the PC, and in addition the user of the PC draws out a disk tray 1 and usually loads the optical disk.

Therefore, usually, the disk device is provided with an eject/lock mechanism of the disk tray, and one example of the proposal by the applicant of the present application is shown in. FIG. 8. The eject/lock mechanism A of this drawing is mainly composed of a lock lever 8 and a self-holding type solenoid 16, and the disk tray 1 is composed to be locked by a lock pin 7a implanted in the bottom board of a chassis case 7 by fitting with the lock lever 8.

Moreover, in such disk device D, a turntable 2 fixed to a driving shaft of a spindle motor disposed right under is arranged at the center of the disk tray 1 as shown in FIG. 1, and this turntable clamps a center hole of the optical disk, and changes over the turning force. Moreover, a head unit or optical pickup unit 3 mainly composed of an optical pickup reciprocates radially in a slit 1a formed in the disk tray for recording and reproduction of information on the optical disk.

And, the disk tray 1 composed like this is guided by a guide rail 6 and contained in chassis case 7.

In addition, usually, the disk device is provided with an eject/lock mechanism for fixing, namely locking the loaded state of the disk tray, when it is loaded and one example of the proposal by the applicant of the present application is shown in FIG. 12. The eject/lock mechanism A of this drawing is composed mainly of a lock lever 8 and a self-holding type solenoid 16, and the disk tray 1 is composed to be locked by a lock pin 7a raised from the bottom board of a chassis case 7 and fixed, by fitting with the lock lever 8.

By the way, the laptop PC is made thinner and thinner in recent years, tending to package the printed wiring board (hereinafter, it is called wiring board) that is provided with electronic components such as a lot of semiconductor integrated circuits on the disk tray, and rising of the packaging density thereof, and consequently, the expansion of packaging effective area of the wiring board in the disk tray becomes an important problem.

However, in case of the aforementioned disk device of the prior art, the wiring board could not be expanded outside than the lock pin 7a because this lock pin 7a was on the approach path of the disk tray 1 and, therefore, the packaging effective area of the wiring board was not able to be expanded.

The present invention has been devised considering such a problem of the prior art, provides an eject/lock mechanism allowing to arrange the lock pin at the outermost side of the disk tray, and thereby, to enhance the packaging effective area of the wiring board to its maximum.

Moreover, the weight of the disk tray itself becomes heavier because the packaging density has risen as mentioned above. Further more because the laptop PC is portable, it is frequently carried on the outdoors site, for instance, to the site of sporting event and exhibition, or to the hall of academic conference, and symposiums. However, the PC main body might be dropped due to an unexpected fault, and the impact be given and, especially fatal damages such as ejection of disk tray leading to the unavailability, namely, accidents disabling the lock of the loaded state of the disk tray, and the recording/reproduction of information are increasing.

This, because the weight of the disk tray itself is growing as mentioned above, for instance, when a laptop PC as shown in FIG. 6 falls down from the side thereof where a disk tray is built in, an impact load due to the gravitational acceleration equal or superior to 200 G might be applied. Then, the lock pin shown in FIG. 1 comes to be damaged or bent from the fixing portion by the lock lever, and the disk tray ends up by dashing out.

If it leads to such a situation, it means that the disk tray can not be put in the PC main body and locked, it becomes impossible to use on the site, and important work such as record information with the PC will be interrupted. And, it is sent to the manufacturer for repair, and will be remedied by exchanging the entire disk device and so on.

The present invention has been devised considering such a problem of the prior art, allowing to prevent beforehand the disk tray from dashing out even if an impact load is received by providing a lock mechanism that operates only when the impact load is applied besides the eject/lock mechanism, for protecting the eject/lock mechanism.

SUMMARY OF THE INVENTION

Then, the present invention concerns a disk device composed to execute a load/unload together with a recording medium by making a disk tray advance and retreat in a chassis case, wherein an eject/lock mechanism operating together with a self-holding type solenoid is arranged in the front edge corner portion of the disk tray and, on the other hand, a start lever that changes over the eject/lock mechanism to the lock state extends along a sidewall of the disk tray.

In addition, the present invention is composed so that the spring force accumulated in the start lever is released and the disk tray pops out, when the lock state of the disk tray is released, to solve the aforementioned problem.

Moreover, a lock lever that can swing and fit with the other one of the disk tray or the chassis case is provided on either one of the disk tray or the chassis case so that the swing of the lock lever be inhibited when the disk tray receives impact load in the load state.

BRIEF DESCRIPTION OF THE DRAWINGS

These and other objects and advantages of the present invention will become clear from the following description with reference to the accompanying drawings, wherein.

DESCRIPTION OF SYMBOLS

Figure 1:
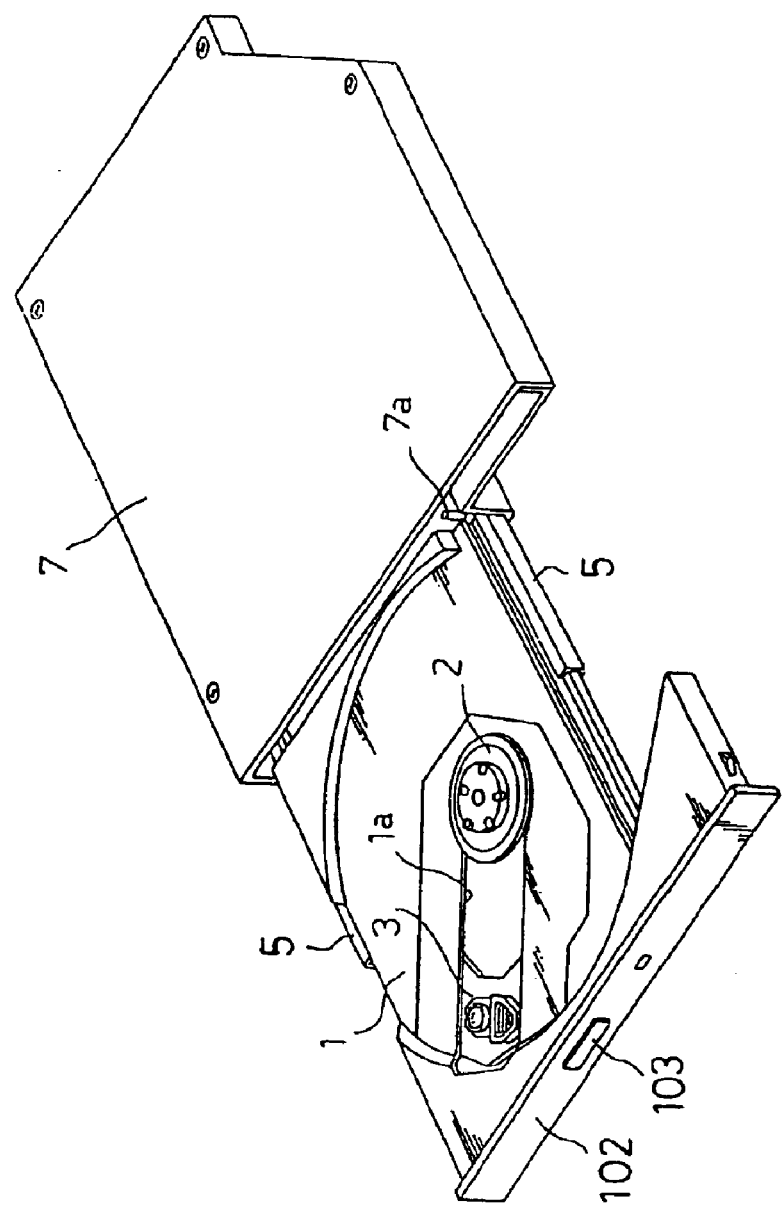
FIG. 1 is a perspective view showing the externals of the disk device that executes the present invention.

A . . . Eject/lock mechanism
B . . . Driving system unit
C . . . Lock mechanism
D . . . Disk device
P . . . PC main body
1 . . . Disk tray
1a . . . Slit
2 . . . Turntable
2a . . . Wiring board
3 . . . Optical pick-up unit
5 . . . Pushbutton
6 . . . Guide rail
7 . . . Chassis case
7a . . . Lock pin
8 . . . Lock lever (of eject/lock mechanism A)
9 . . . Helical torsion spring(of eject/lock mechanism A)
9a . . . Post
10 . . . Operation lever
11 . . . Screw receiving boss
12 . . . Fitting boss
12a . . . Screw receiving boss
13 . . . Helical extension spring
14 . . . Coupling cam member
16 . . . Self-holding type solenoid
18 . . . Start lever
20 . . . Tensile coil spring
60 . . . Support rail
70 . . . Lock lever(of lock mechanism C)
80. Slider block
100 . . . Helical torsion spring(of lock mechanism C)
102 . . . Bezel.

DETAILED DESCRIPTION OF THE PREFERRED EMBODIMENT

Now, embodiments of the present invention shall be described in detail based on drawings. It should be noted that the embodiments described below suppose a composition where the disk device is built in the PC main body, the present invention is not limited to this, but it can also be execute for a disk device of an external type. Though the description shall be given based on the embodiment where a lock mechanism using a slider block of the present invention mentioned below is executed to the disk tray of the disk device, the expected purpose can also be achieved in the form executed to the chassis case to accommodate the disk tray.

FIG. 1 is view showing the externals of disk device D that executes the present invention, and the symbol 1 shows the disk tray in this drawing, and a turntable 2 that rotates and drives the optical disk is arranged in the center portion. And, a slit 1a is formed in the disk tray 1, and an optical pick-up unit or head unit 3 moves radially in the slit, to record or reproduce information on the optical disk. A bezel 102 is installed in the front of the disk tray 1, and a pushbutton 103 of the switch to drive disk tray 1 by the manual operation is exposed. The disk tray composed like this is supported and guided by a guide rail 5, and loaded into or unloaded from the chassis case 7.

Figure 2:
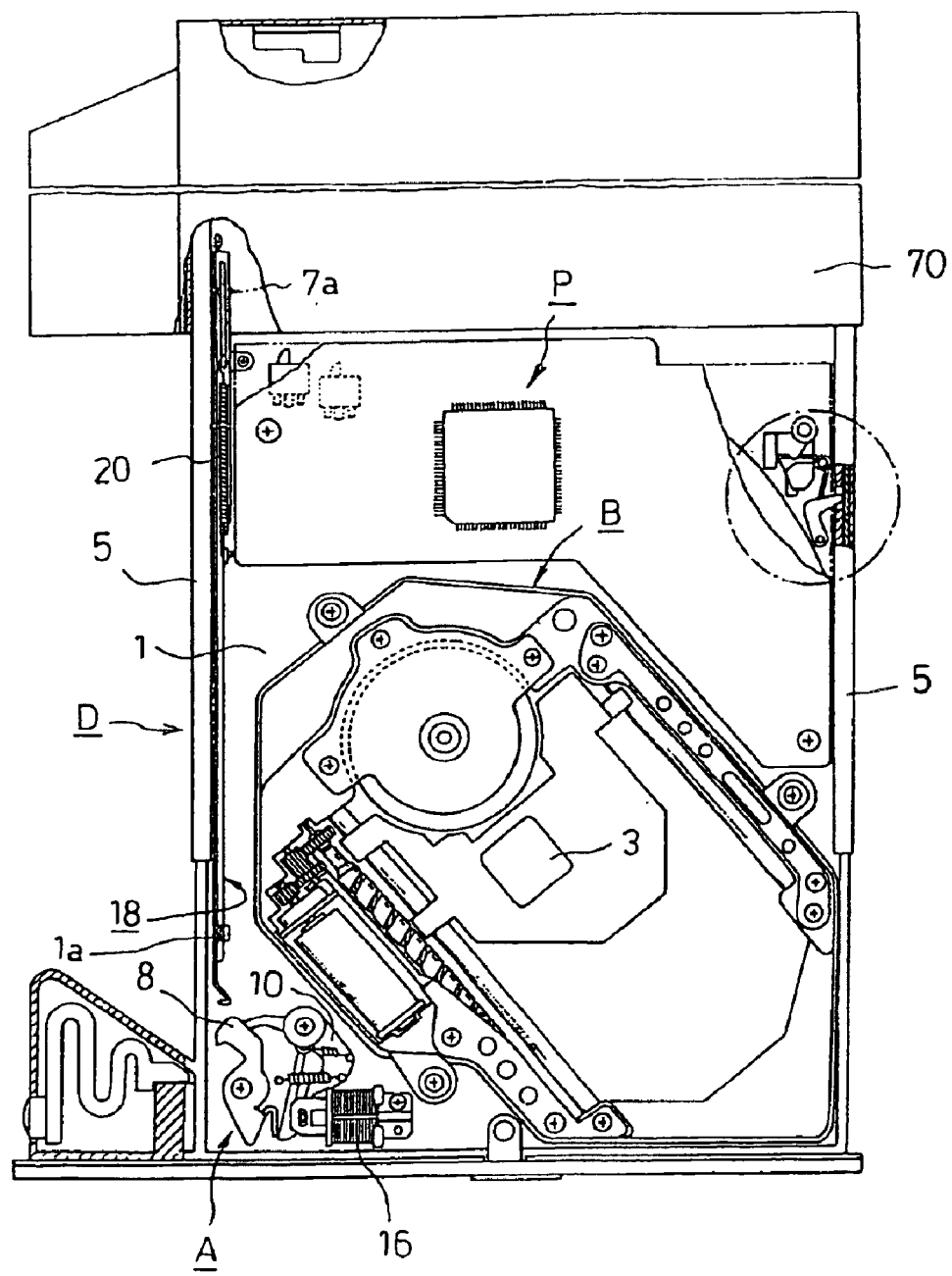
FIG. 2 is a plan showing the composition of the bottom of the disk device of FIG. 1.

FIG. 2 shows the state where the shield cover is detached from the bottom of disk tray 1, a driving system unit B of the optical disk and the optical pickup are arranged at the center, and a wiring board P where electronic components such as semiconductor circuit element and so on are packaged is disposed on the rear side thereof. And, an eject/lock mechanism A is set in the front edge corner portion of the disk tray 1.

Figure 3:
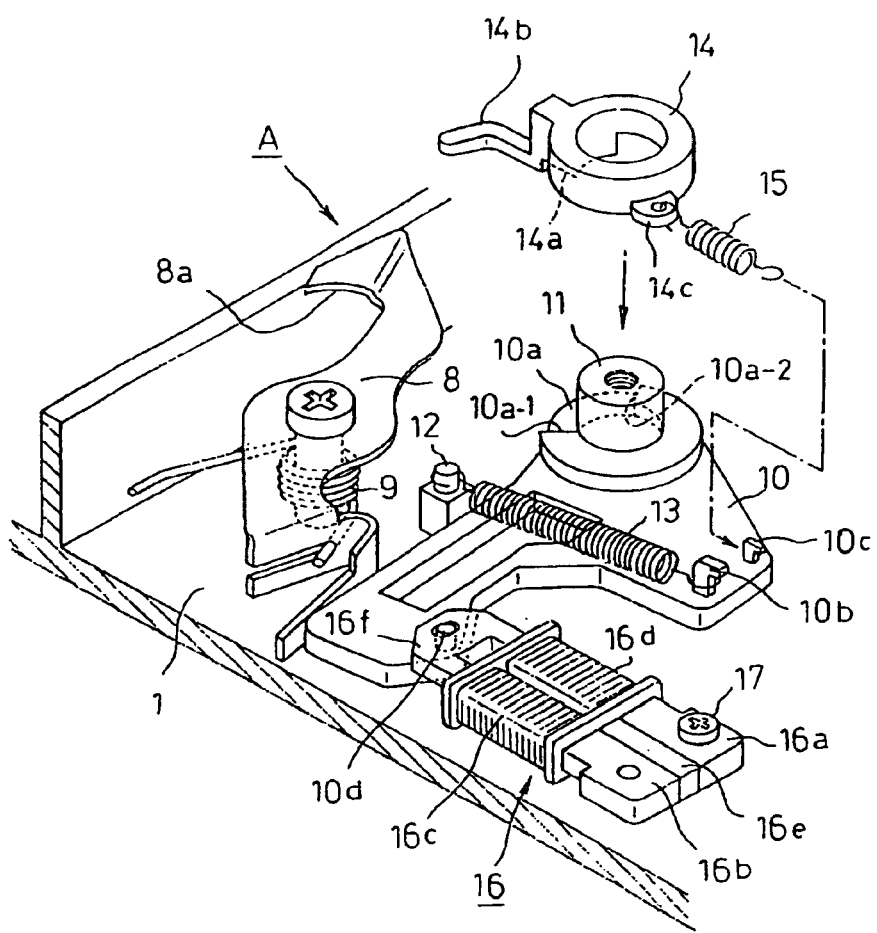
FIG. 3 is a perspective view showing the composition of eject/lock mechanism of the present invention.

FIG. 3 is a view showing the composition of eject/lock mechanism A is concretely, the symbol 8 in this drawing is a lock lever supported by axis in a way that it can swing, and a point 8a of the lock lever presents the shape of hook as shown in FIG. 1 in order to connect it with a lock pin 7a fixed to the chassis case 7. Moreover, a rear end 8b of lock lever 8 is biased by a helical torsion spring 9 anti-clockwise and is in contact with the edge of the operation lever 10.

The operation lever 10 is axially supported at the point thereof by a screw receiving boss 11 that is standing formed from the disk tray 1 so that the whole can swing. A tensile coil spring 13 is stretched tightly between a fitting boss 12 that is standing formed from the disk tray 1 and a hook 10b formed on the operation lever 10 which is biased clockwise all times, but stopped by the contact with the fitting boss 12.

A concave stepped part 10a defined by fitting walls 10a-1 and 10a-2 is formed in an axial insertion part of the screw receiving boss 11 of the operation lever 10, and coupling cam member 14, that has convex stepped part 14a connected with this concave stepped part and an arm lever 14b as one body, is axially inserted into the screw receiving boss 11. Therefore, the convex stepped part 14a becomes possible to swing in the concave stepped part 10a. It should be noted that this coupling cam member 14 is always biased anti-clockwise by a tensile coil spring 15 stretched tightly between a fitting part 14 c formed on the outer circumferential face and a hook 10c of the operation lever 10, and the position, in which the convex stepped part 14a comes in contact with the fitting wall 10a-1, becomes a rotation stop position.

Next, the symbol 16 is a self-holding type solenoid that becomes driving source of the lock and eject, and the point of a couple of yorks 16a·16b is inserted from one end of excitation coils 16c·16d and fixed approximately at the middle. And, a permanent magnet 16e is installed in the edge of the york 16a·16b, and, as a result, a magnetic circuit in the horseshoe shape is formed. On the other hand, the open end portion of a movable piece 16f that is a magnetic substance is inserted slidably into the other end of the excitation coil 16c·16d.

Therefore, in the stationary state, it is maintained in a state with the movable piece 16f has been sucked by the magnetism of a magnetic circuit formed with the permanent magnet 16e. And, the magnetic field generated by the permanent magnet 16e is cancelled by applying direct current to generate a magnetic field opposite to the magnetic field generated by a permanent magnet from the terminal of excitation coil 16c·16d, and the restraint of the movable piece 16f will be released. The movable piece 16f works synchronizing with the lock lever 8 and operation lever 10 because the movable piece 16f is connected to a pin 10d of the operation lever 10. This self-holding type solenoid 16 is fixed to the disk tray 1 with a screw 17.

Figure 4:
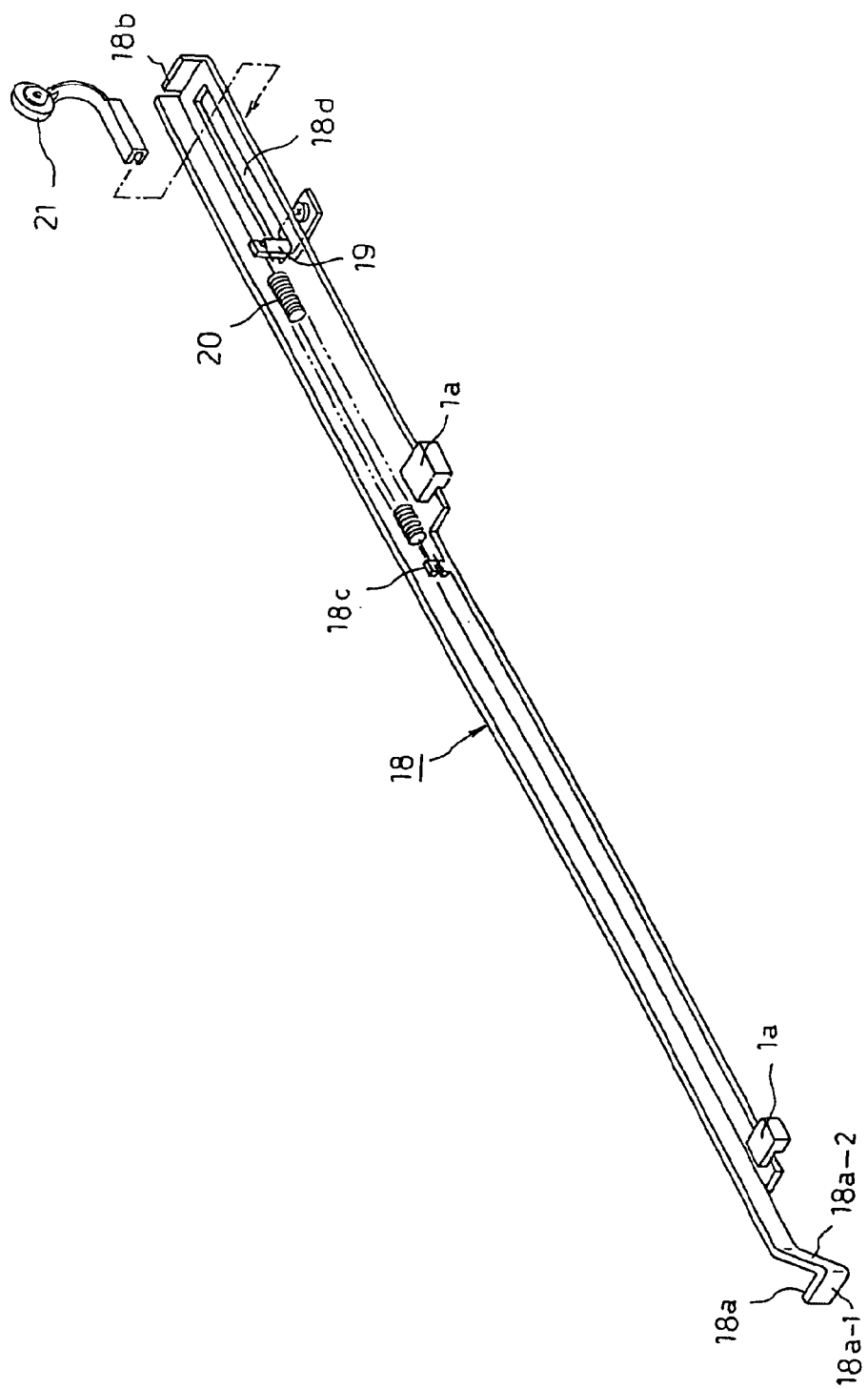
FIG. 4 is a perspective view showing the start lever to changes over the eject/lock mechanism of FIG. 3 to the lock state.

Next, a long start lever 18 for changing over the eject/lock mechanism that is in the eject state to the lock state extends along the sidewall of the disk tray 1 as shown in FIG. 2 and slides being supported by an angle 1a that is formed on the disk tray 1. As for FIG. 4, the composition of the start lever 18 is concretely shown, a point 18a that becomes an action edge is bent, forming a flat face 18a-1, and an inclined plane 18a-2. A cut up piece is formed at the rear end 18b, and this cut up piece touches the rear end inner wall of the chassis case 7 and the entire start lever advances.

As tensile coil spring 20 is stretched tightly between a hook 18c of the start lever 18 and a hook 19 fixed to the disk tray 1, the spring force of this tensile coil spring 20 is accumulated, when the disk tray 1 enters the lock state and the start lever 18 is advanced, the entire start lever will be biased backward. Therefore, the disk tray 1 will always be biased forward while the rear end 18b touches the inner wall of the chassis case 7. And, the range where the start lever 18 slides by this bias force is fixed by a long hole 18d formed at the rear edge thereof. The symbol 21 is a contact that becomes an earth lead to the chassis case 7. The disk tray 1 and the chassis case 7 are connected electrically through the start lever 18 by the contact of the contact 21 with the chassis case when the disk tray is unloaded.

Figure 5:
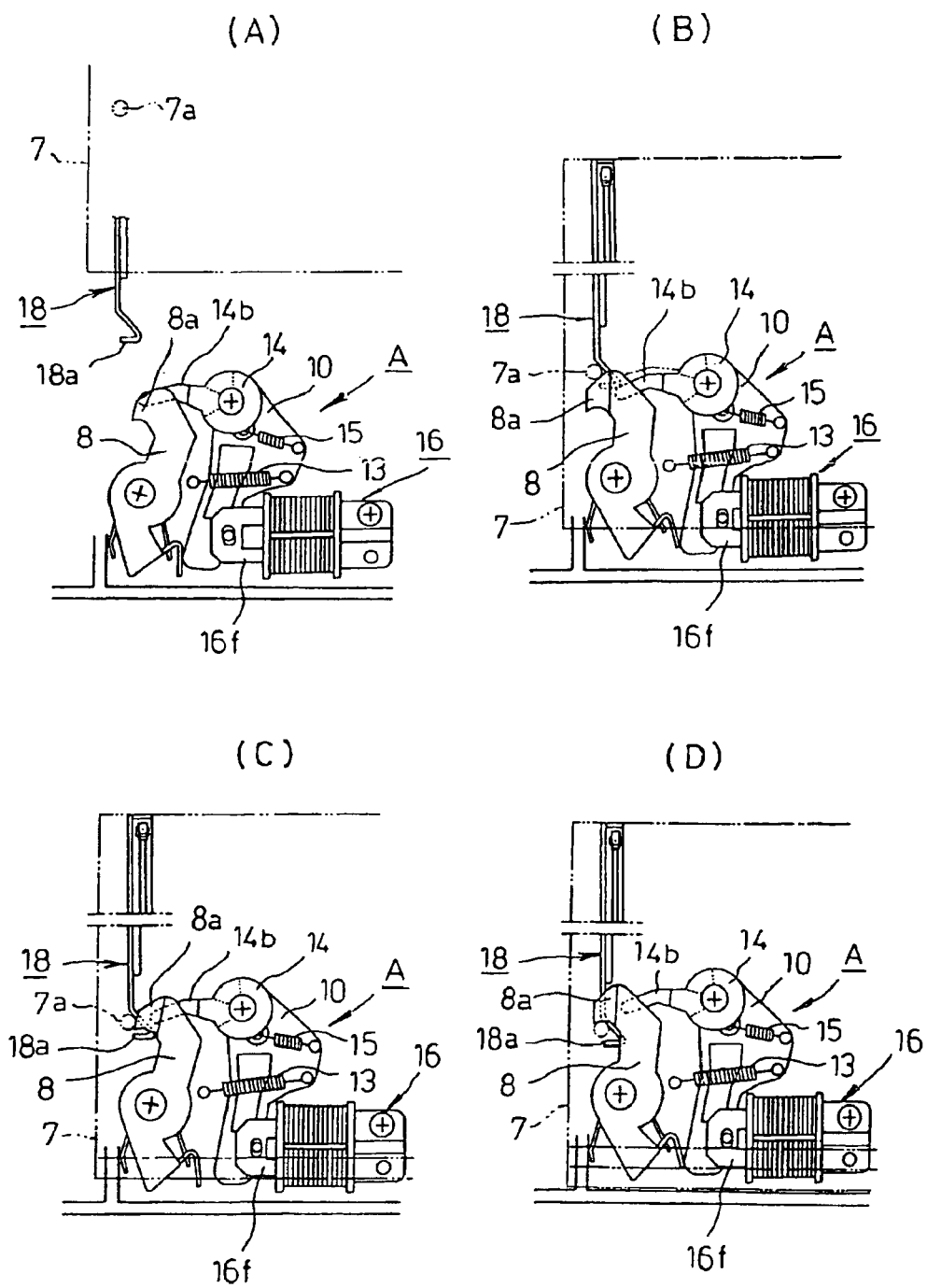
FIG. 5 is a process drawing showing the process where eject/lock mechanism of the present invention leads to the lock state.
Figure 6:
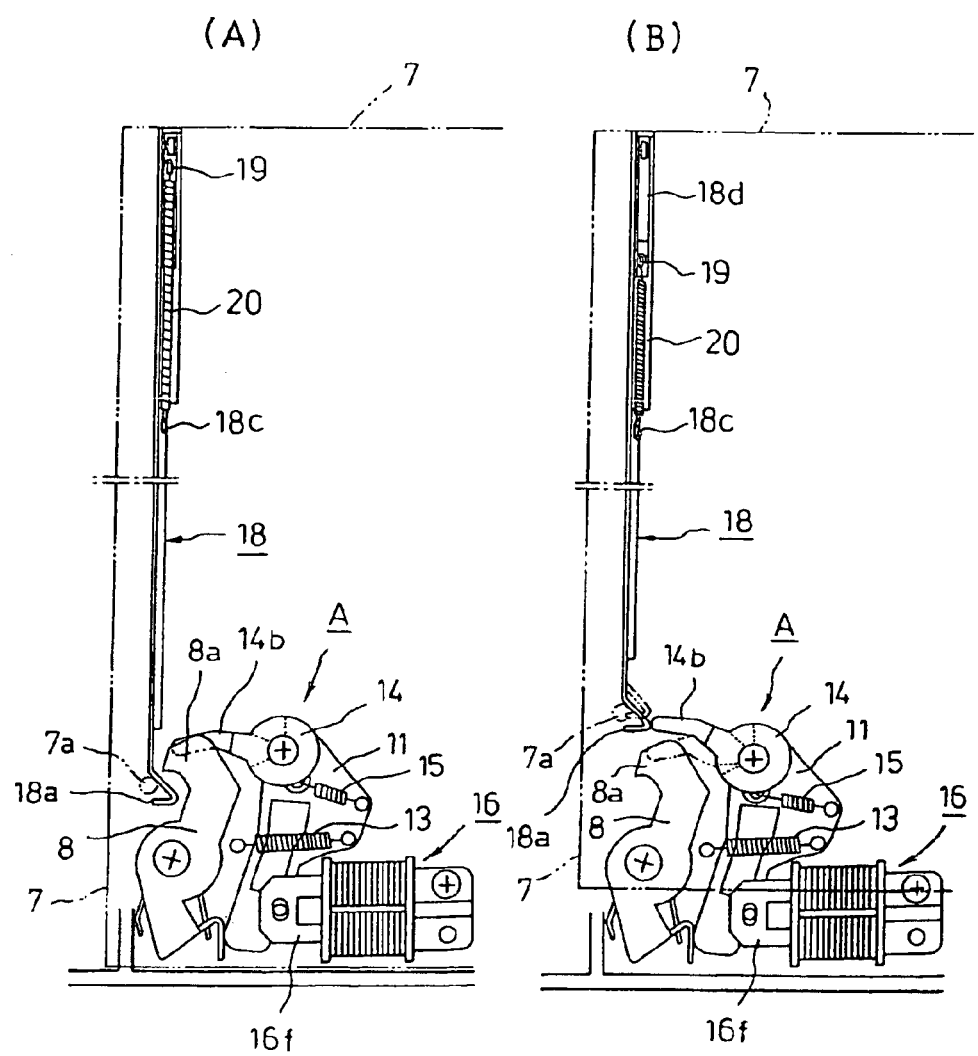
FIG. 6 is a process drawing showing the process where eject/lock mechanism of the present invention leads to the eject state.
Figure 7:
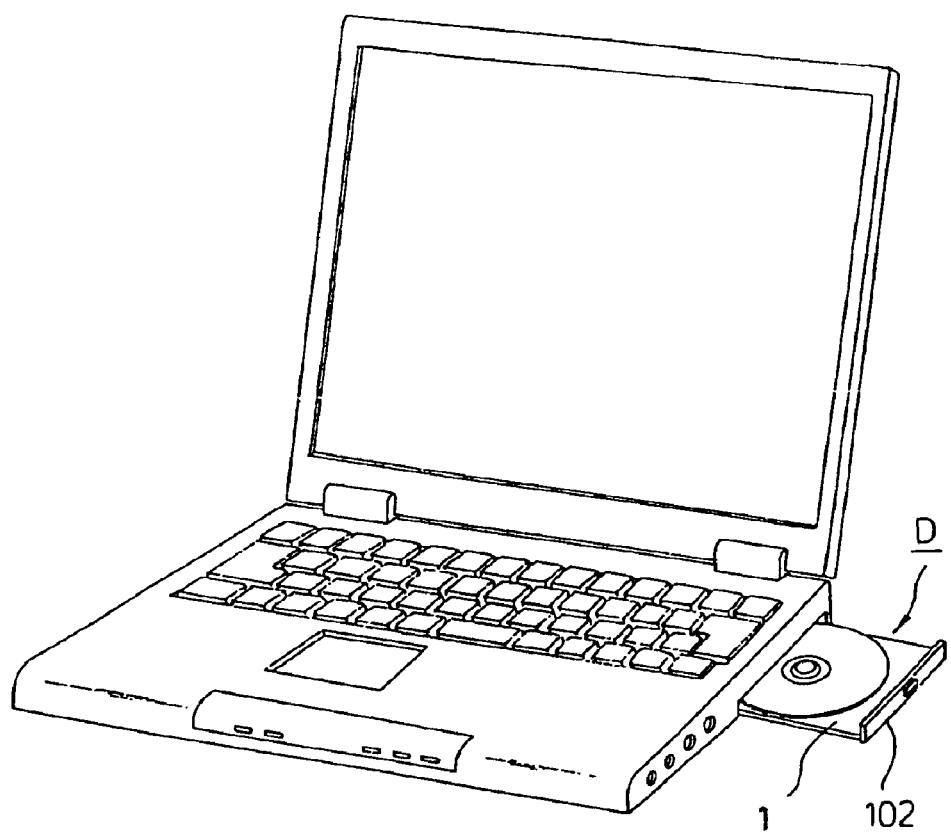
FIG. 7 is a perspective view showing externals of the laptop PC.
Figure 8:
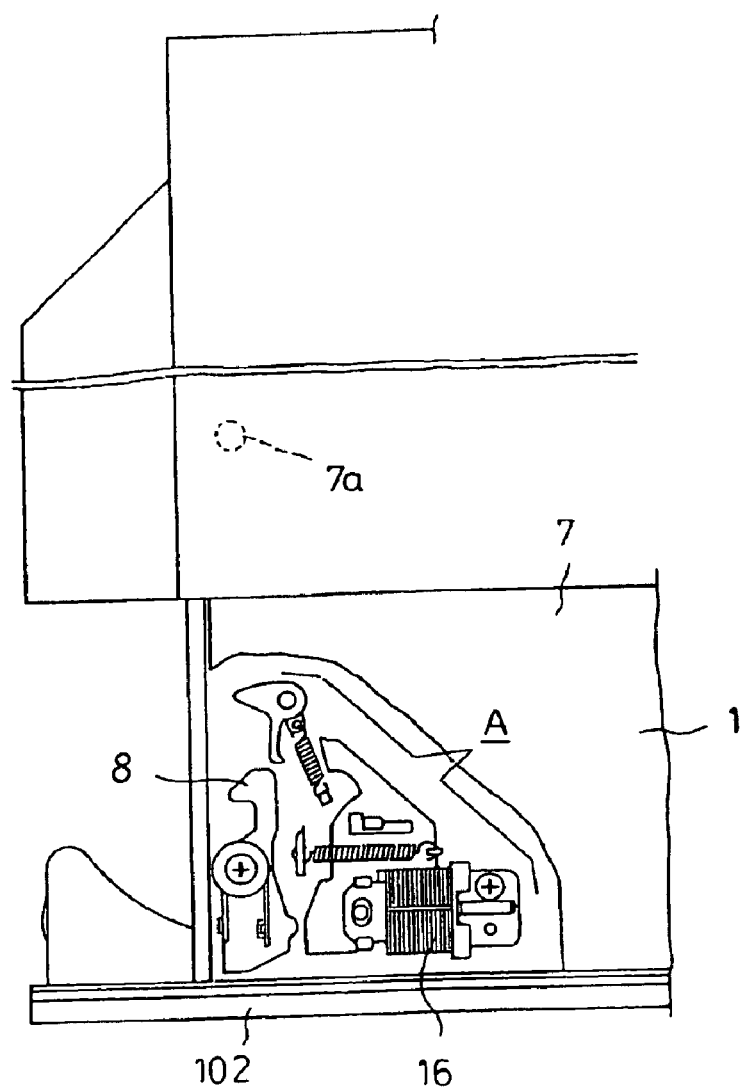
FIG. 8 is a plan view showing an example of eject/lock mechanism of the prior art.

Next, the operation mode of the eject/lock mechanism according to the present invention shall be described based on FIG. 5 to FIG. 6.

FIG. 5 is the one to show the process to the state of the lock, and FIG. 5(A) shows the state of the ejected first stage. Because, in this state, the movable piece 16f of the self-holding type solenoid 16 is separated greatly from the yorks 16a·16b and has not been sucked by magnetism, the operation lever 10 is biased clockwise by the spring force of the tensile coil spring 13, and rests at the position shown in the same drawing.

When the disk tray 1 is pushed in from this state, flat face 18a-1 of the point 18a of the start lever 18 touches the arm lever 14b of the coupling cam member 14 and depresses it as shown in FIG. 5(B). Then, because the convex stepped part 14a of the coupling cam member 14 has come in contact with the fitting wall 10a-1 of the concave stepped part 10a of the operation lever 10 at this time, the operation lever 10 rotates in the anti-clockwise direction, the movable piece 16f of the self-holding type solenoid 16 is pushed, sucked and maintained by the magnetism of the yorks 16a·16b.

At this time, the lock lever 8 also rotates in the anti-clockwise direction by the spring force of the helical torsion spring 9, as the operation lever 10 rotates in the anti-clockwise direction, and the inclined plane at the point 8a of the lock lever and the lock pin 7a of the chassis case 7 come in contact. Moreover when the disk tray 1 is pushed in further, the start lever 18 gets over the point of the arm lever 14b, and the lock pin 7a arrives at a top point Ba of the lock lever as shown in FIG. 5(C). the lock lever 8 showing reverses in the anti-clockwise direction, it connects with the lock pin 7a, and the disk tray 1 is locked as shown in FIG. 5(D).

Next, the user first operates the pushbutton 5 of the switch of the bezel 4, or direct current is applied to the self-holding type solenoid 16 by the instruction from the PC main body to release the lock by the eject/lock mechanism A, for unloading, that is, ejecting the disk tray. At this time, the eject/lock mechanism A is in the state of the lock of FIG. 5(D). And, the magnetic field that has been generated by a permanent magnet 16e is canceled by the magnetic field excited by the excitation coil 16c·16d when a direct current is applied, and the restraint of movable piece 16f will be released.

Arriving at this state, as shown in FIG. 6(A), the operation lever 10 rotates clockwise by the action of the tensile coil spring 13, and following this, the lock lever 8 rotates in the direction of clockwise. As a result, the lock pin 7a is released from the point 8a of the lock lever 8, that is, enters the eject state, as shown in the same drawing. At the same time, the spring force accumulated in the tensile coil spring 20 stretched tightly on the start lever 18 is released, and the disk tray 1 start to pop out as shown in FIG. 6(B).

At this time, as the arm lever swings being pushed up as shown in this drawing by the inclined plane 18a-2, it never becomes obstructive in the path of back of start lever 18, though the start lever 18 relatively retreats in respect to the disk tray, and the point 18a thereof comes in contact with the arm lever 14b of the coupling cam member 14 as the disk tray 1 advances. Thus, the disk tray 1 enters the end position of pop out, that is, the state of FIG. 5(A), and completes the eject.

As it is obvious from the forgoing, according to the composition of the present invention, the start lever 18 is provided with the function for changing over the eject/lock mechanism A to the lock state and, at the same time, the function capable of popping out the disk tray 1 by the spring force accumulated in the tensile coil spring 20 of the start lever 18 in the course of changing over to this lock state, thereby the composition thereof is simplified with the small number of the component.

When returning again to FIG. 1a, showing a state where a shield cover molded with a metallic lamina is detached from the bottom face of the disk tray 1, a wiring board 2a, that provides with electronic components such as semiconductor integrated circuits, is packaged on this disk tray, a driving system unit A to drive the optical disk and the head unit is arranged at the center portion, and the eject/lock mechanism A of the disk tray is set in the corner portion of the front edge.

Next, the symbol 7 shows the chassis case, and a state where the bottom board of this chassis case appears is shown in this drawing. And, a lock pin 7a of the disk tray is fixed, in a state rising toward the inside, to the bottom board of the chassis case 7, and when the disk tray 1 is loaded, the lock lever 8 of the eject/lock mechanism A connects it.

Figure 1A:
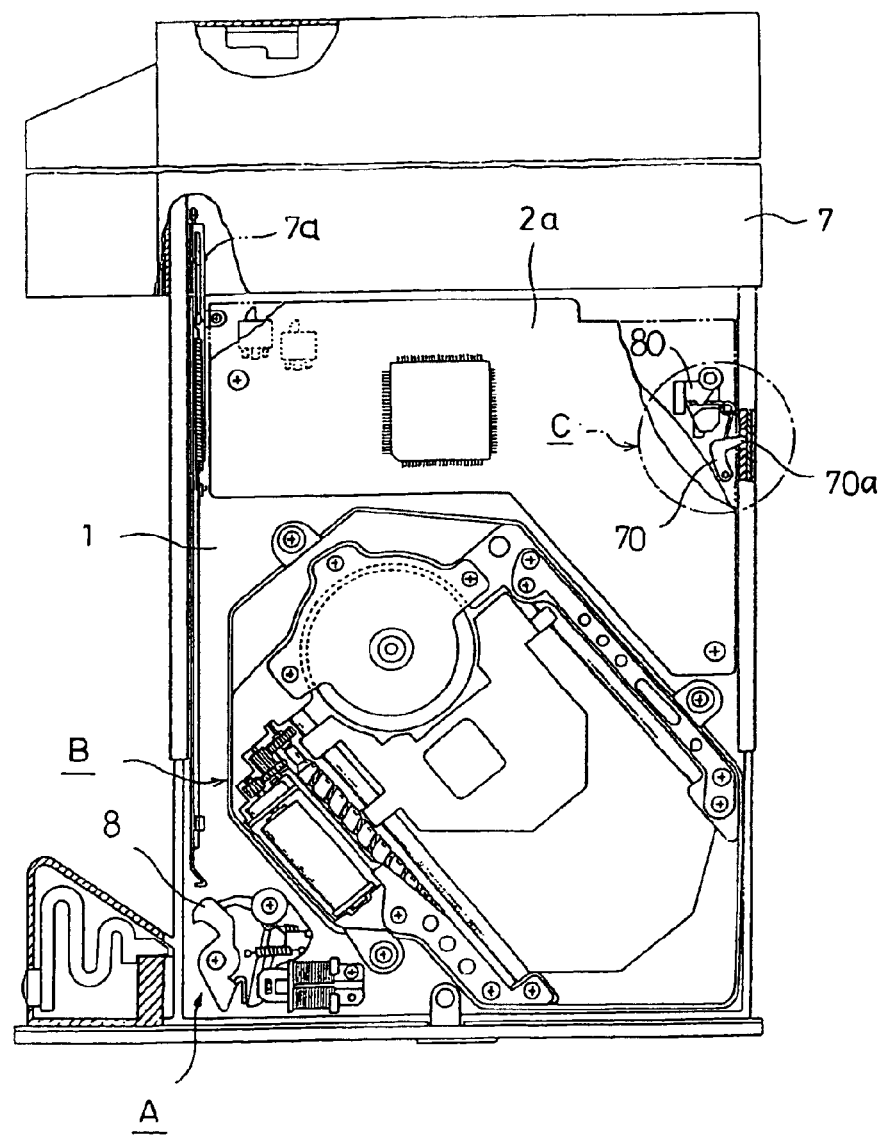
FIG. 1a is a view showing the bottom face of the disk device that executes the present invention.
Figure 1B:
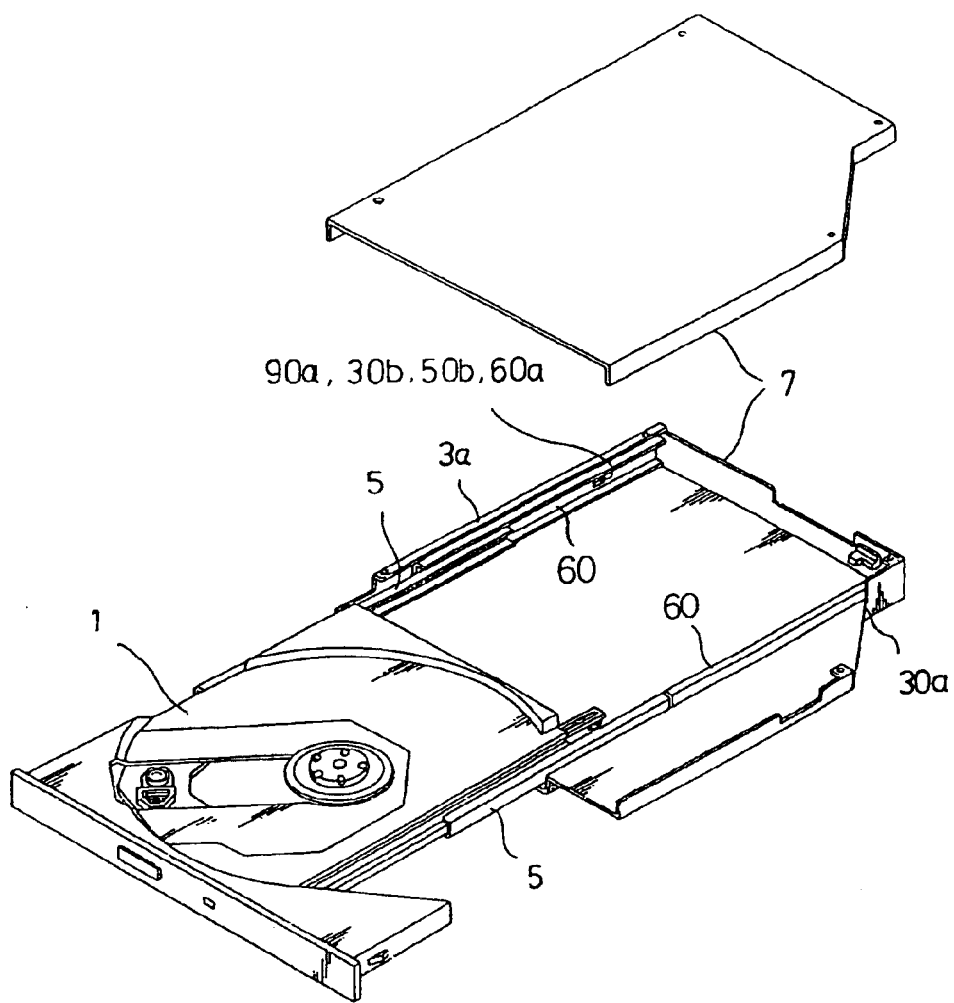
FIG. 1b is a perspective view showing the disk device that executes the present invention.

FIG. 1b is a perspective view that shows the assembly state of the disk tray 1 and the shield chassis 30, and both sides of the disk tray 1 are supported loosely by a guide rail 6, and in addition, this guide rail is slidably supported by a support rail 60 fixed to the sidewall 30a of the chassis case 7.

Figure 9:
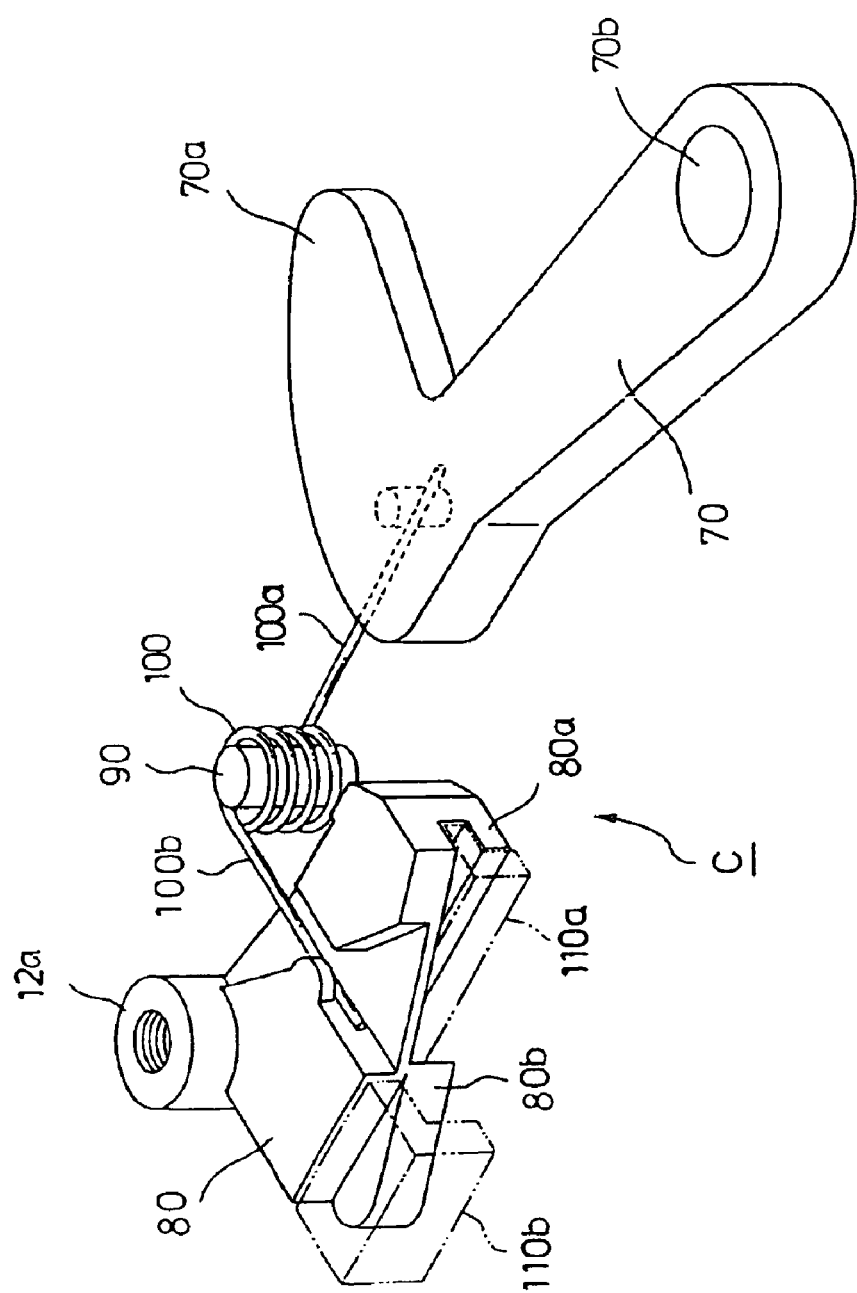
FIG. 9 is a perspective view showing the composition of the lock mechanism according the present invention.

Next, the lock mechanism C of the present invention is set in the interior portion of disk tray 1 as shown in FIG. 1a, and is mainly composed of a lock lever 70 that becomes a movable element and a slider block 80. The slider block 80 is disposed movably between the intercept position in which the swing of the lock lever 70 is obstructed and the back position in which the swing is not obstructed, and positioned at the intercept position when an impact load is received with the disk tray loaded. Moreover, the direction of the movement where the slider block moves from the back position to the intercept position is substantially same as the direction of the movement where the disk tray unloads. FIG. 9 shows in detail the composition of the lock mechanism C, and the lock lever 70 is biased clockwise around the fulcrum 70b thereof, because the lock lever 70 that can swing is fitted with an arm 100a of a helical torsion spring 100 fitted to a post 9a that is formed rinsing from the disk tray 1.

In the other hand, as for slider block 80, a couple of shoes 80a·80b, that run side by side, are formed at the lower part of the main body thereof, and this shoe is supported by an angle piece 110a·110b formed on the disk tray 1. Therefore, this slider block 80 is made possible to slide back and forth, and always biased towards the tray rear edge by an arm 100b of the helical torsion spring 100, but stopped at the position in contact with a screw receiving boss 12a which fixes the wiring board 2a formed on the disk tray 1.

It should be noted that the spring force of the helical torsion spring 100 may be slight of the extent in which the lock lever 70 and the slider block 80 can be held at a given position. Moreover, it is preferable to make the mechanical response of the slider block 80 rise by forming with synthetic resin or metal of large mass.

Figure 10:
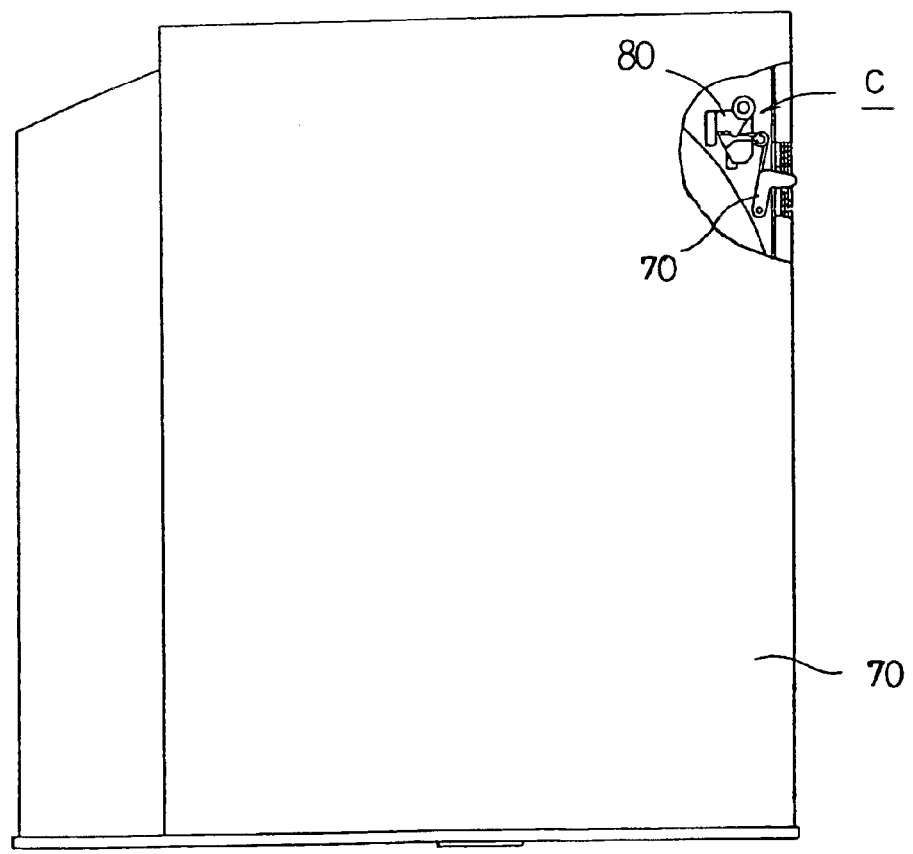
FIG. 10 is a view showing the state of arrangement of the lock mechanism according the present invention.
Figure 11:
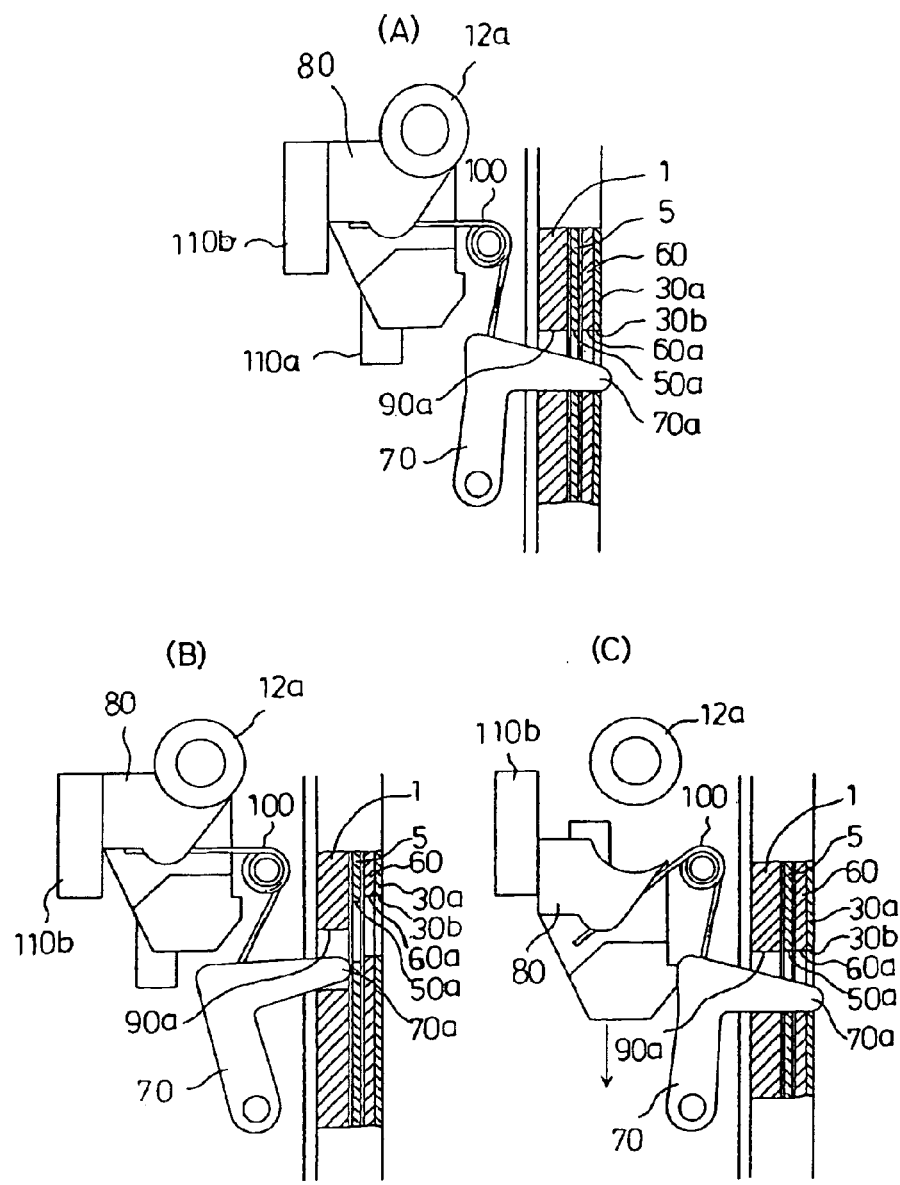
FIG. 11 is a view showing the operation mode of the lock mechanism according the present invention.
Figure 12:
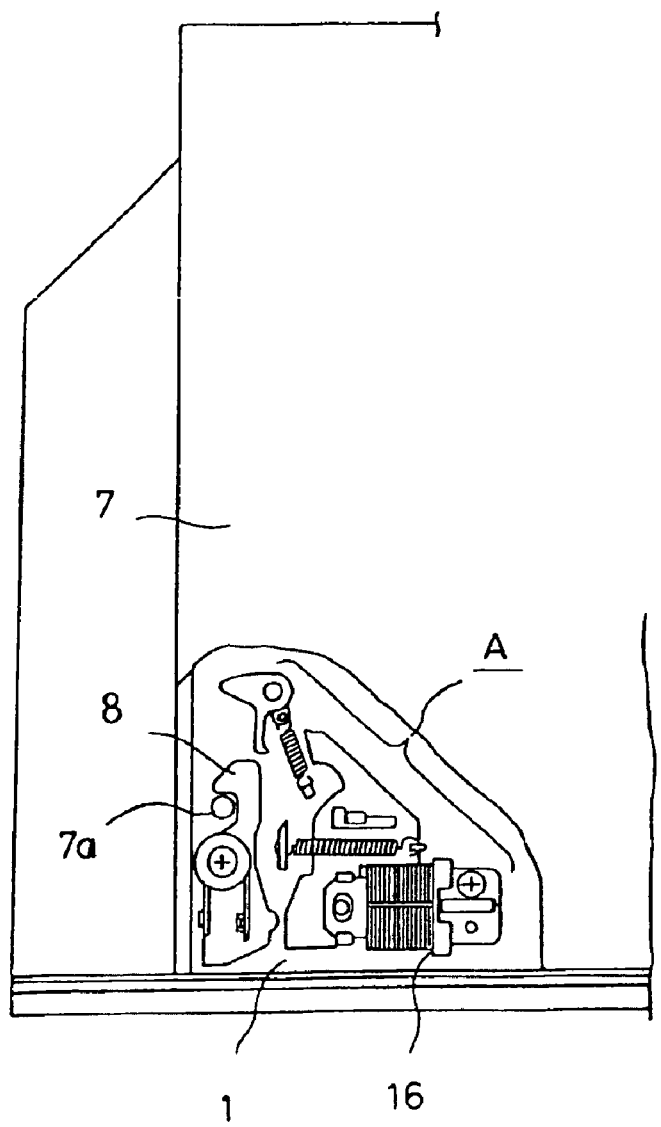
FIG. 12 is a view showing an example of eject/lock mechanism.

As for the lock lever 70, in the load state where the disk tray 1 is completely contained in the chassis case 7 as shown in FIG. 10, an aperture 90a in the sidewall of disk tray 1, an aperture 50a of the guide rail 5, an aperture 60a of the support rail 60, and an aperture 30b in the sidewall 30a of the chassis cases are aligned, while a point 70a of the lock lever 70 rests facing to the respective aperture, as shown in FIG. 11(A).

On the other hand, when unloading of the disk tray 1 is begun and the movement starts, the point 70a of the lock lever 70 is immediately pushed up to the aperture 30b in the sidewall 30a of the chassis case and the aperture 30b of the support rail 60, it runs aground on the inner wall of the guide rail 5 as shown in FIG. 11(B), and the point 70a of the lock lever 70 comes slidably in contact with this inner wall and continues moving.

FIG. 11(B) shows a lock mechanism C operation in the normal fettle not receiving the impact load; however, in the disk tray 1 load state, that is, when the lock mechanism C is in a state as shown in FIG. 11(A), if an impact load in the disk tray ejection direction is applied to the disk tray 1 by the chute of the PC main body and so on, at this very moment, that is, before the disk tray 1 begins the movement, the slider block 80 slides in the direction of the lock lever 70, and the top portion of the slider block 80 comes in contact with the lock lever 70 as shown in FIG. 11(C).

It enters the state that slider block 80 becomes a wedge when entering this state, the swing of the lock lever 70 in the anti-clockwise direction is obstructed, and the state where the point 70a of the lock lever 70 runs aground on the aperture 30b of the chassis case and the aperture 50a of the guide rail 5 and the guide rail 5 is maintained. Therefore, a compulsory load applied between the lock pin 7a and the lock levers 8 of the eject/lock mechanism A is decreased, because a stationary state of the disk tray 1 is maintained and the damage thereof can be prevented.

Though the behavior of the slider block 80 when the impact load is applied is momentary, and it returns to the position of FIG. 11(A) at once by the action of the helical torsion spring 100, as the impact load is, usually, the one temporarily generated very in short course, the purpose can be achieved satisfactorily only by inhibiting momentary the swing of the lock lever 70.

Moreover, the present invention is devised to move the slider block 80 in a direction parallel to the direction where disk tray 1 is moved as mentioned above and, as a result, when an impact load is applied in the ejection direction of disk tray, this slider block 80 responds directly to the impact load, and slides to the ejection direction of disk tray, to become a wedge in respect to the lock lever 70. The mechanical response can be enhanced, and the damage of eject/lock mechanism can surely be obstructed, because the reactive operation to the impact load is never converted, for instance, to the rotating movement, by composing like this.

According to the present invention as explained in detail hereinabove, the eject/lock mechanism allows to arrange the lock pin at the outermost side of the chassis case, because the eject/lock mechanism is set in the corner portion of the disk tray, and the start lever to change over this eject/lock mechanism to the lock state extends along the side wall of the disk tray. Whereby, it becomes possible to enhance the packaging effective area of the wiring board to its maximum, the disk device high density can be improved and to have considerable effects and, moreover, as a lock mechanism responding to the impact load is provided, a disk device wherein the disk tray never destroy the eject/lock mechanism and dash out due to the fall of the PC and so on, and presenting extremely high system safety and reliability can be realized.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A disk device composed to execute a load/unload together with a recording medium by making a disk tray advance and retreat in a chassis case, wherein:

the disk tray has a front edge and a sidewall disposed substantially perpendicular to the front edge, and an eject/lock mechanism operating together with a self-holding type solenoid is arranged in a front edge corner portion of said disk tray, and a start lever driven by the chassis ease to move relative to the disk tray for changing over the eject/lock mechanism to a lock state extends along the sidewall of the disk tray.

2. The disk device of claim 1, wherein a spring force accumulated in the start lever is released and the disk tray pops out, when the lock state of the disk tray is released.

3. A disk device composed to execute a load/unload together with a recording medium by making a disk tray advance and retreat in a chassis case, wherein:

an eject/lock mechanism operating together with a self-holding type solenoid is arranged in a front edge corner portion of said disk tray, and a start lever for changing over the elect/lock mechanism to a lock state extends along a sidewall of the disk tray, said start lever is provided with a driving part changing over the eject/lock mechanism to the lock state and installed to move between a first position and a second position, and said start lever moves to the second position from the first position according to a loading operation of said disk tray, and the driving part of said start lever that moves to the second position from the first position changes over said eject/lock mechanism to the lock state.

4. A disk device composed to execute a load/unload together with a recording medium by making a disk tray advance and retreat in a chassis case, wherein:

an eject/lock mechanism operating together with a self-holding type solenoid is arranged in a front edge corner portion of said disk tray, and a start lever for changing over the eject/lock mechanism to a lock state extends along a sidewall of the disk tray, said start lever is provided with a contact that comes in contact with said chassis case, and said disk tray and said chassis case are connected electrically through said start lever, by said contact having come in contact with said chassis case, when said disk tray is unloaded.

5. A disk device composed to execute a load/unload together with a recording medium by making a disk tray advance and retreat in a chassis case, comprising:

a lock mechanism provided with a lock lever configured and arranged to swing on one of said disk tray or said chassis case, and to be connected to the other one of said disk tray or said chassis case with engagement by the swing of said lock lever, wherein the lock mechanism is configured and arranged to inhibit the swing of said lock lever when the disk tray receives an impact load during loading.

6. The disk device of claim 5, comprising a slider block movably disposed between an intercept position for inhibiting the swing of said lock lever and a back position where the swing is not inhibited, wherein said slider block is positioned in the intercept position when the impact load is received with said disk tray loaded.

7. The disk device of claim 6, wherein a direction in which said slider block moves from the back position to the intercept position is substantially the same as a direction of movement in which said disk tray unloads.

* * * * *

UNITED STATES PATENT AND TRADEMARK OFFICE
CERTIFICATE OF CORRECTION

| | | |
|---|---|---|
| PATENT NO. | : 6,925,647 B1 | Page 1 of 1 |
| APPLICATION NO. | : 10/402906 | |
| DATED | : August 2, 2005 | |
| INVENTOR(S) | : Hidetoshi Kabasawa | |

It is certified that error appears in the above-identified patent and that said Letters Patent is hereby corrected as shown below:

Column 6, line 4, "Ba" should read --8a--; and

Column 8, claim 3, line 63, "elect/lock" should read --eject/lock--.

Signed and Sealed this

Twenty-eighth Day of November, 2006

JON W. DUDAS
*Director of the United States Patent and Trademark Office*